(12) United States Patent
Kawada et al.

(10) Patent No.: US 6,658,333 B2
(45) Date of Patent: Dec. 2, 2003

(54) CONTROL APPARATUS OF POWER STEERING DEVICE

(75) Inventors: Hideaki Kawada, Maebashi (JP); Yusuke Itakura, Maebashi (JP); Yasuhiko Miyaura, Maebashi (JP); Shuji Endo, Maebashi (JP); Hisayoshi Koiwai, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/060,292

(22) Filed: Feb. 1, 2002

(65) Prior Publication Data

US 2002/0120378 A1 Aug. 29, 2002

(30) Foreign Application Priority Data

Feb. 2, 2001 (JP) ........................................ 2001-026794

(51) Int. Cl.[7] ............................................... B62D 5/04
(52) U.S. Cl. ......................................... 701/41; 180/443
(58) Field of Search ............................. 701/41, 36, 72, 701/42, 43, 69; 180/443, 170, 400, 140, 446; 303/140, 150

(56) References Cited

U.S. PATENT DOCUMENTS

| | | | | |
|---|---|---|---|---|
| 4,753,310 A | * | 6/1988 | Hashimoto | 180/446 |
| 5,596,252 A | * | 1/1997 | Shimizu et al. | 318/432 |
| 5,913,375 A | * | 6/1999 | Nishikawa | 180/168 |
| 6,324,452 B1 | * | 11/2001 | Ikegaya | 701/41 |
| 6,354,396 B1 | * | 3/2002 | Horton et al. | 180/446 |
| 6,389,338 B1 | * | 5/2002 | Chandy et al. | 701/29 |
| 6,405,113 B1 | * | 6/2002 | Yamawaki et al. | 701/41 |
| 2002/0022912 A1 | * | 2/2002 | Urabe et al. | 701/41 |

FOREIGN PATENT DOCUMENTS

| | | |
|---|---|---|
| JP | 62-152880 | 9/1987 |
| JP | 8-18564 | 2/1996 |

* cited by examiner

Primary Examiner—Thomas G. Black
Assistant Examiner—Ronnie Mancho
(74) Attorney, Agent, or Firm—Sughrue Mion, PLLC

(57) ABSTRACT

A control apparatus of power steering device having functions of monitoring intermediate troubles such as offset or drift out of signal troubles of torque sensor, and limiting the current for limiting the assist function is presented. In a control apparatus of power steering device for controlling a motor on the basis of a current control value calculated from a steering assist command value calculated by calculating means on the basis of a steering torque generated on a steering shaft, and a current value of a motor for applying a steering assist force to a steering mechanism, wherein the difference of a main torque signal and a sub torque signal of a torque sensor for detecting the steering torque is stored preliminarily, and the difference of the main torque signal and the sub torque signal during operation is compared with the stored value, and at least the current control value is limited when the difference based on the comparison is a condition larger than a first prescribed value and continues for a time longer than a first prescribed time.

10 Claims, 15 Drawing Sheets

CONTROL APPARATUS OF POWER STEERING DEVICE

BACKGROUND OF THE INVENTION

1. Field of the Invention

The present invention relates to a control apparatus of a power steering device for applying a steering assist force by a motor by a steering system of automobile or other vehicle, and more particularly to a control device of a power steering device having functions of monitoring troubles such as intermediate offset or drift among signal troubles of a torque sensor and limiting the assist function.

2. Description of the Related Art

A power steering apparatus for assisting a steering system of an automobile or other vehicle with an assist load by rotating force of a motor is designed to apply an assist load to the steering shaft or rack shaft by transmission mechanism such as gear or belt by way of reduction gears. In a conventional power steering device, in order to generate the assist torque (steering auxiliary torque) accurately, the motor current is controlled by feedback. The feedback control is intended to control the motor applied voltage so as to minimize the difference between the current command value and motor current detection value, and the motor applied voltage is generally controlled by the duty ratio of pulse width modulation (PWM) control.

A general configuration of a power steering device is shown in FIG. 1, in which a shaft 2 of a steering wheel 1 is coupled to a tie rod 6 of turning wheels by way of universal joints 4a and 4b, and a rack-and-pinion mechanism 5. The shaft 2 has a torque sensor 10 for detecting the steering torque of the steering wheel 1, and a motor for assisting the steering force of the steering wheel 1 is coupled to the shaft 2 by way of a clutch 21 and reduction gears 3. A control unit 30 for controlling the power steering device receives an electric power from a battery 14 through an ignition key 11 and a relay 13, and the control unit 30 calculates the steering assist command value I of assist command on the basis of the steering torque T detected by the torque sensor 10 and the vehicle speed V detected by a vehicle speed sensor 12, and controls the current to be supplied to the motor 20 on the basis of the calculated steering assist command value I. The clutch 21 is turned on or off by the control unit 30, and it is turned on (coupled) in an ordinary running state. When the control unit 30 judges the power steering device to be abnormal, or when the power source (voltage Vb) of the battery 14 is turned off by the ignition key 11 and relay 13, the clutch 21 is turned off (disconnected).

The control unit 30 is mainly composed of CPU, and a general function executed by a program in the CPU is shown in FIG. 2.

Explaining the function and operation of the control unit 30, the steering torque T detected and entered by the torque sensor 10 is compensated of phase in a phase compensator 31 in order to heighten the stability of the steering system, and the phase-compensated steering torque TA is inputted to a steering assist command value calculator 32. The vehicle speed V detected by the vehicle speed sensor 12 is also inputted to the steering assist command value calculator 32. The steering assist command value calculator 32 refers to a characteristic map (lookup table) 33 on the basis of the entered steering torque TA and vehicle speed V, and determines the steering assist command value I which is the control target value of the current to be supplied to the motor 20.

The steering assist command value I is inputted to a subtractor 30A, and is also inputted to a differential compensator 34 of feedforward system in order to enhance the response speed, and the deviation (I−i) determined in the subtractor 30A is inputted to a proportion calculator 35, and the proportion output is inputted to an adder 30B and is also inputted to an integral calculator 36 in order to improve the characteristics of the feedback system. The outputs of the differential compensator 34 and integral calculator 36 are inputted to the adder 30B, and the sum result in the adder 30B, that is, the current command value E is inputted to a motor drive circuit 37 as a motor drive signal. The motor current value "i" of the motor 20 is detected in a motor current detecting circuit 38, and the motor current detection value "i" is inputted to the subtractor 30A and is fed back.

Herein, as the conventional torque sensor 10, a type designed to output a main torque signal TM and a sub torque signal TS is used. This is for safety measure in case of failure of the torque sensor 10, and whether trouble or not cannot be judged by one signal output alone. Hitherto, accordingly, monitoring the difference of the main torque signal TM and the sub torque signal TS, and when the difference more than a prescribed value continues for a prescribed time, it is judged to be abnormal, and the assist is cut off.

By using a characteristic map as shown in FIG. 3 having an abrupt rising characteristic, drift of torque sensor or offset voltage in a range not causing serious effect hitherto has come to have a large effect on steering when taking place abruptly while steering, and the assist amount may be excessive depending on the steering status, and an abnormal steering behavior despite the driver's will may occur, which may lead to a serious accident.

In the conventional trouble detection based on the difference between the main torque signal TM and sub torque signal TS, depending on the change in the drift or offset as shown in FIG. 4, such abnormal behavior may not be detected until the trouble is detected. Further, by setting a severe threshold for detecting trouble, if attempted to detect an intermediate trouble such as offset, considering the adjusting range of the torque sensor before shipping, a severe threshold may lead to wrong detection, and trouble cannot be detected correctly.

A small offset value generated gradually in a long course of time may cause a difference in right and left steering forces, but does not cause uncontrollable behavior of steering. In such a case, not leading to halt of assist, it is unpleasant for the driver, and steering error may occur, and therefore it is necessary to give some warning or limit the assist.

The present invention is devised in the light of such background, and it is hence an object of the invention to present a control apparatus of power steering device having functions of monitoring intermediate troubles such as offset or drift among signal troubles of torque sensor, inhibiting the assist in the event of a relatively large offset, and limiting the assist function when a trouble is detected in the case of a relatively small offset.

SUMMARY OF THE INVENTION

The present invention relates to a control apparatus of power steering device for controlling a motor on the basis of a current control value calculated from a steering assist command value calculated by calculating means on the basis of a steering torque generated on a steering shaft, and a current value of a motor for applying a steering assist force to a steering mechanism, and this object is achieved by the configuration in which the difference of a main torque signal and a sub torque signal of a torque sensor for detecting the steering torque is stored preliminarily, and the difference of the main torque signal and the sub torque signal during operation is compared with the stored value, and at least the motor current output is stopped when the state of the difference by the comparison being different from a second prescribed value larger than a first prescribed value continues for a time shorter than a prescribed time.

The object of the present invention is effectively achieved by the configuration in which the steering assist command value is calculated on the basis of the output of a normal mode characteristic map, and when the state of the difference by the comparison being different from the first prescribed value continues for a prescribed time, it is changed over to a torque sensor offset abnormal mode characteristic map, or the current control value is limited according to the vehicle speed, or an intermediate characteristic map is used so as to change without any sense of strangeness when changing over from the normal mode characteristic map to the torque sensor offset abnormal mode characteristic map.

DESCRIPTION OF THE PREFERRED EMBODIMENTS

According to the present invention, the difference between a main torque signal TM and a sub torque signal TS in the initial state of shipment is stored in a nonvolatile memory, and the stored value is compared with the difference between the main torque signal TM and the sub torque signal TS during operation, and the assist is inhibited at a relatively large offset, and the assist function is limited when a trouble is detected at a relatively small offset. Therefore, the output can be limited in the event of a sudden increase in the assist torque, so that uncontrollable steering due to excessive assist can be avoided.

Figure 5:
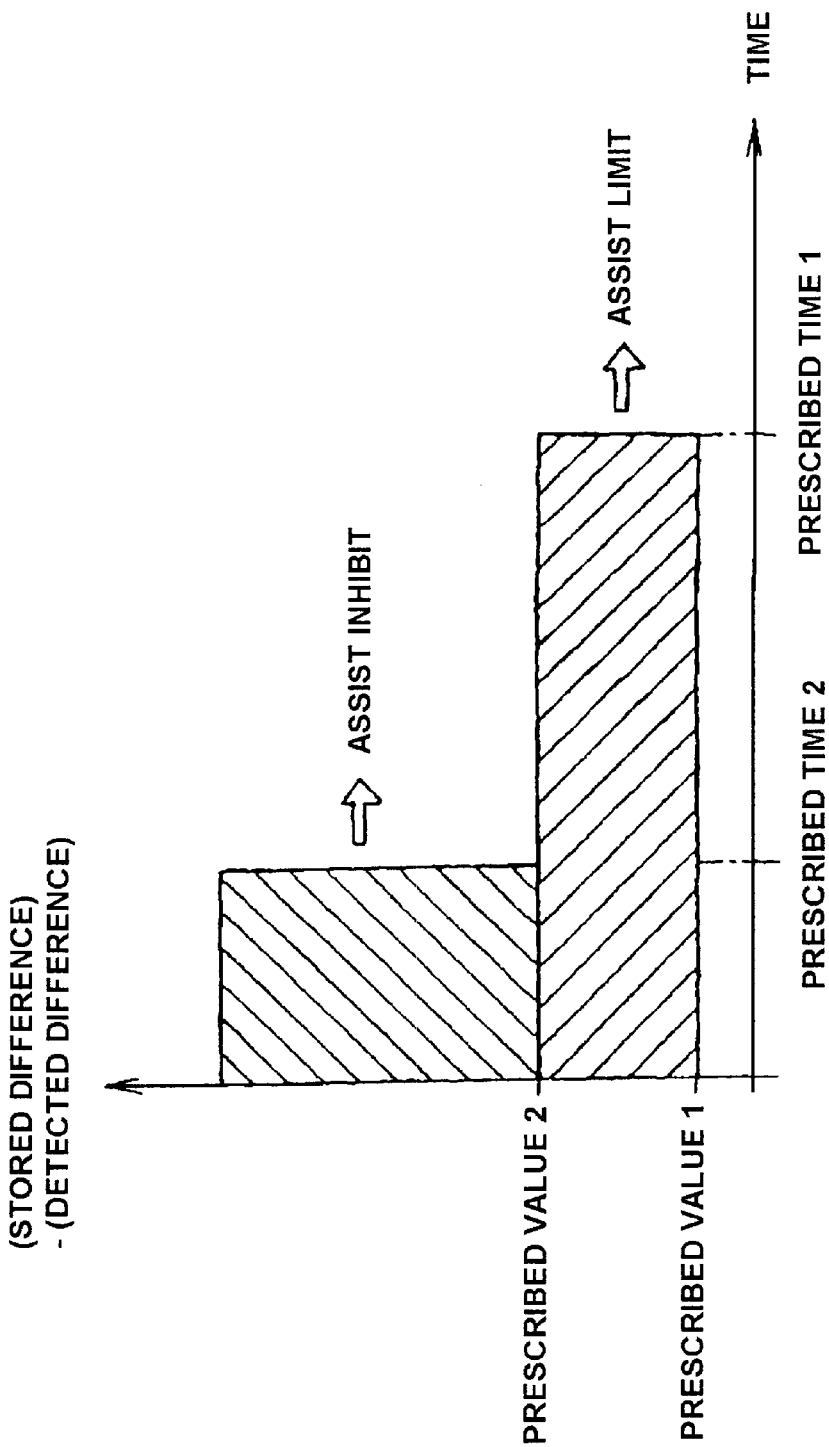
FIG. 5 is a diagram for explaining the basic principle of the present invention.

FIG. 5 shows a basic principle of the present invention, in which the stored difference between a main torque signal TM and a sub torque signal TS and the detected difference between the main torque signal TM and the sub torque signal TS are compared with a prescribed value 2 (>prescribed value 1), and when the difference continues for a time shorter than a prescribed time 2 (<prescribed time 1), the assist is inhibited. When the difference is smaller than the prescribed value 2 and larger than the prescribed value 1, and continues for the prescribed time 1 longer than the prescribed time 2, the assist is limited. Thus, a safer operation is realized by inhibiting or limiting the current command value.

In the current limiting method, the maximum current value of the current command value may be limited, or the maximum current value may be limited by multiplying the current command value by a specified gain. Further, when limiting the current command value, the limit value may be set slightly higher if the speed is low, or slightly lower if the speed is high. Further, in the event of abnormality, by changing over the normal mode characteristic map for assist to the torque sensor offset abnormal mode characteristic map, similar effects are obtained. Moreover, by using an intermediate characteristic map having an intermediate value when changing over from the normal mode characteristic map to the torque sensor offset abnormal mode characteristic map, a smooth change without sense of strangeness may be realized.

Referring now to the drawings, preferred embodiments of the present invention are described in detail below.

Figure 1:
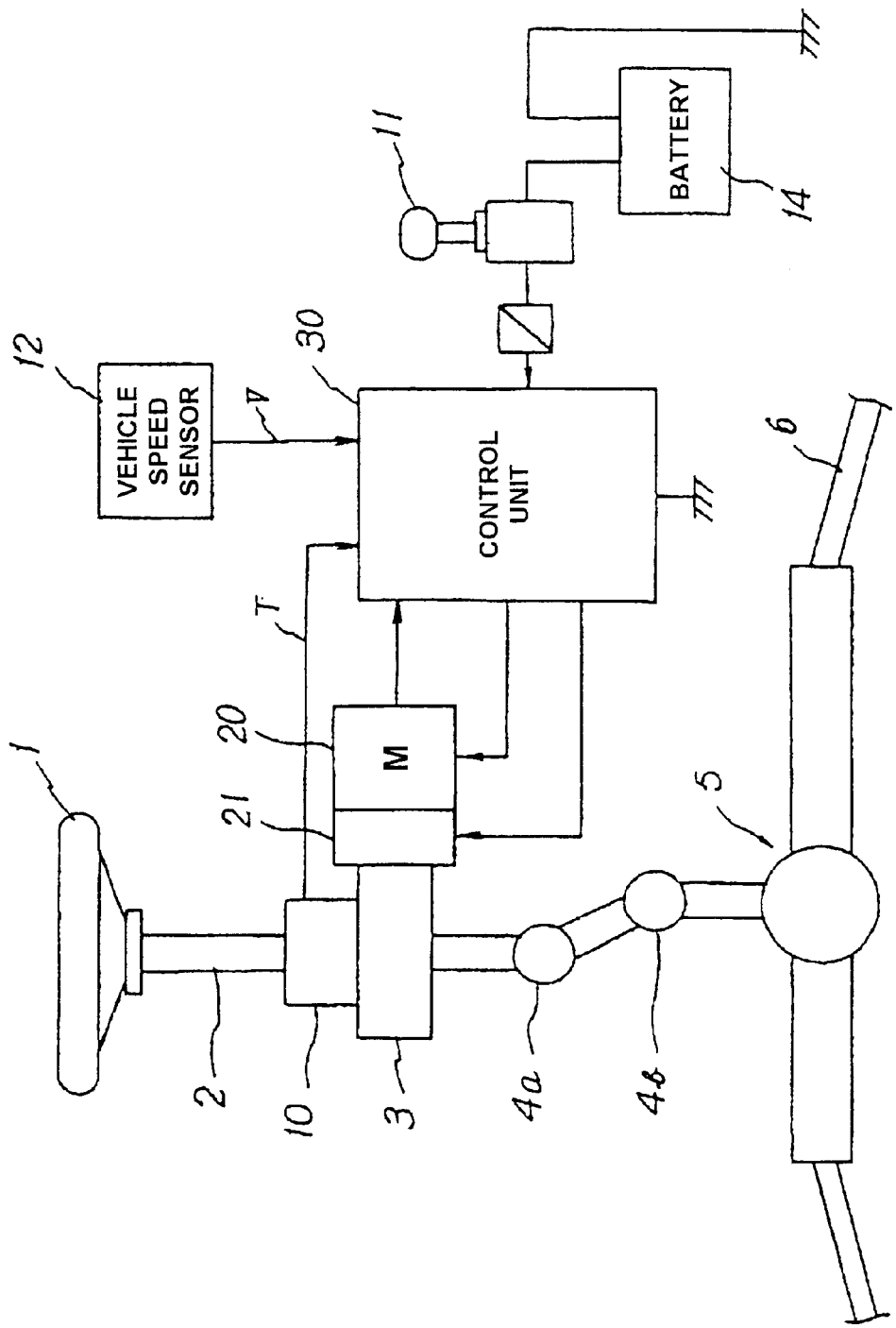
FIG. 1 is a structural diagram showing a schematic configuration of a power steering device.
Figure 2:
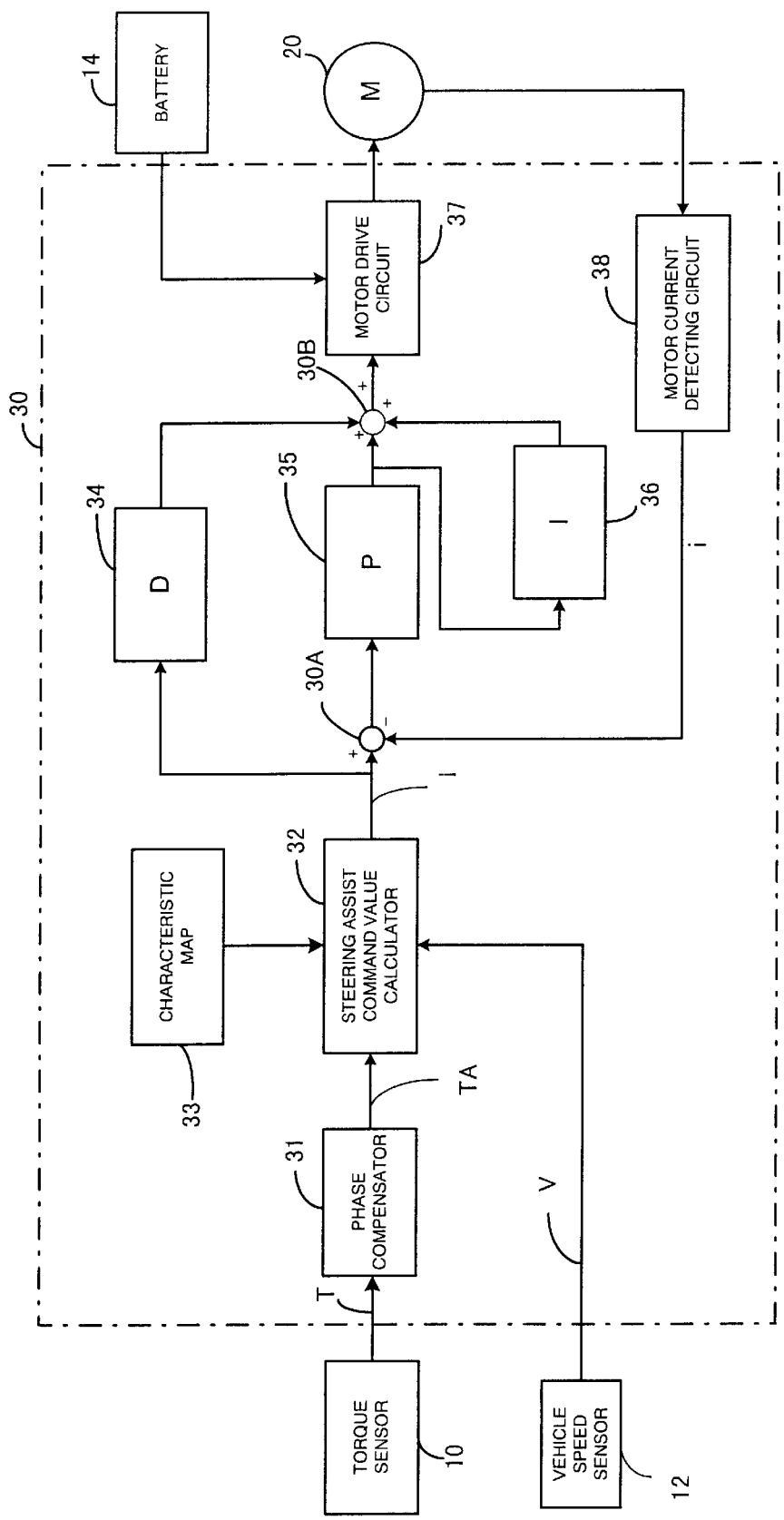
FIG. 2 is a block structural diagram showing an example of control apparatus of a power steering device.
Figure 3:
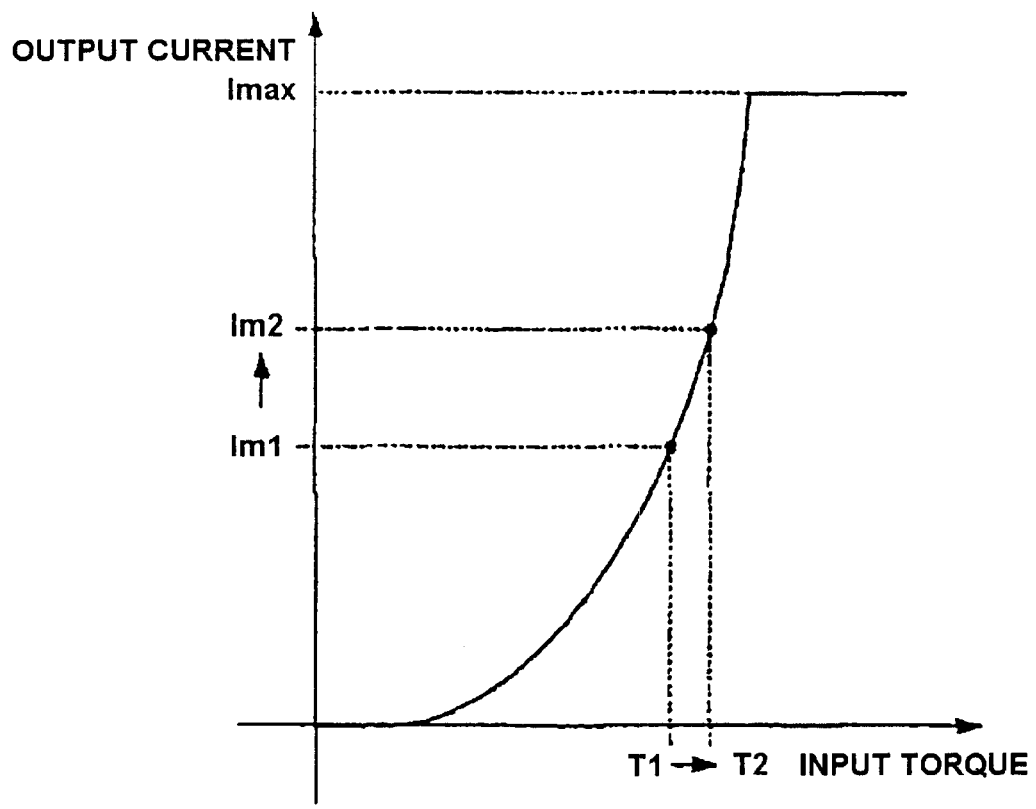
FIG. 3 is a diagram showing a characteristic example of the characteristic map.
Figure 4:
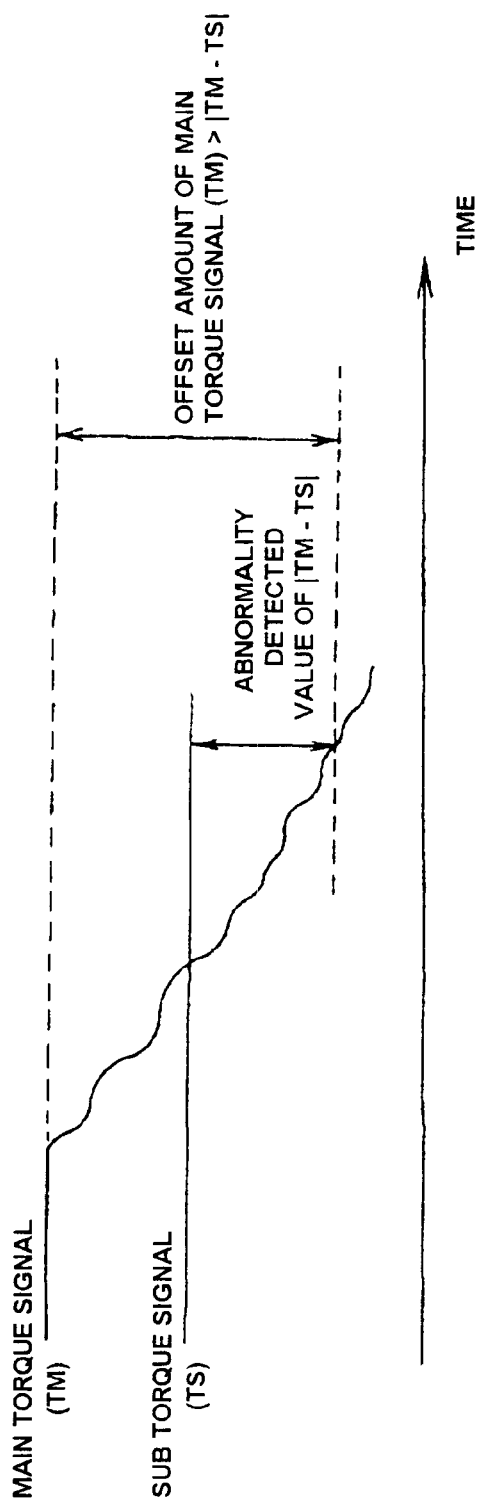
FIG. 4 is a diagram for explaining the characteristic of the torque sensor.
Figure 6:
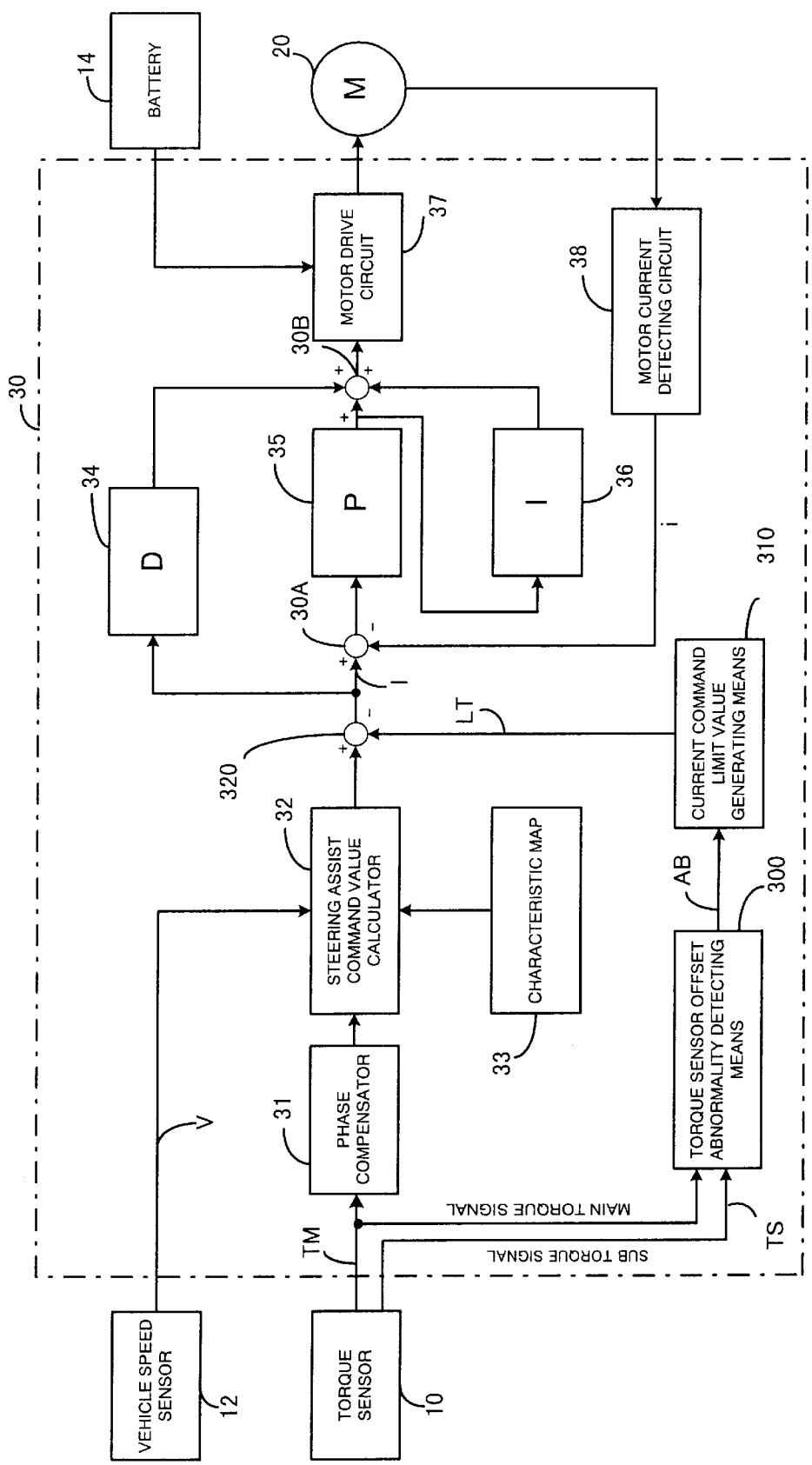
FIG. 6 is a block diagram showing a configuration of a first embodiment of the present invention.

FIG. 6 is a block diagram of a first embodiment of the present invention corresponding to FIG. 2, which comprises a torque sensor offset abnormality detecting means 300, a current command limit value generating means 310 and a subtractor 320, and the output of the subtractor 320 is a steering assist command value I. The torque sensor 10 outputs a main torque signal TM and a sub torque signal TS having the characteristics as shown in FIG. 3, and the main torque signal TA is inputted to the phase compensator 31, and is also inputted to the torque sensor offset abnormality detecting means 300. The sub torque signal TS is inputted to the torque sensor offset abnormality detecting means 300, and when an operation signal AB is outputted from the torque sensor offset abnormality detecting means 300, the current command limit value generating means 310 feeds a limit current LT into the subtractor 320.

Figure 7:
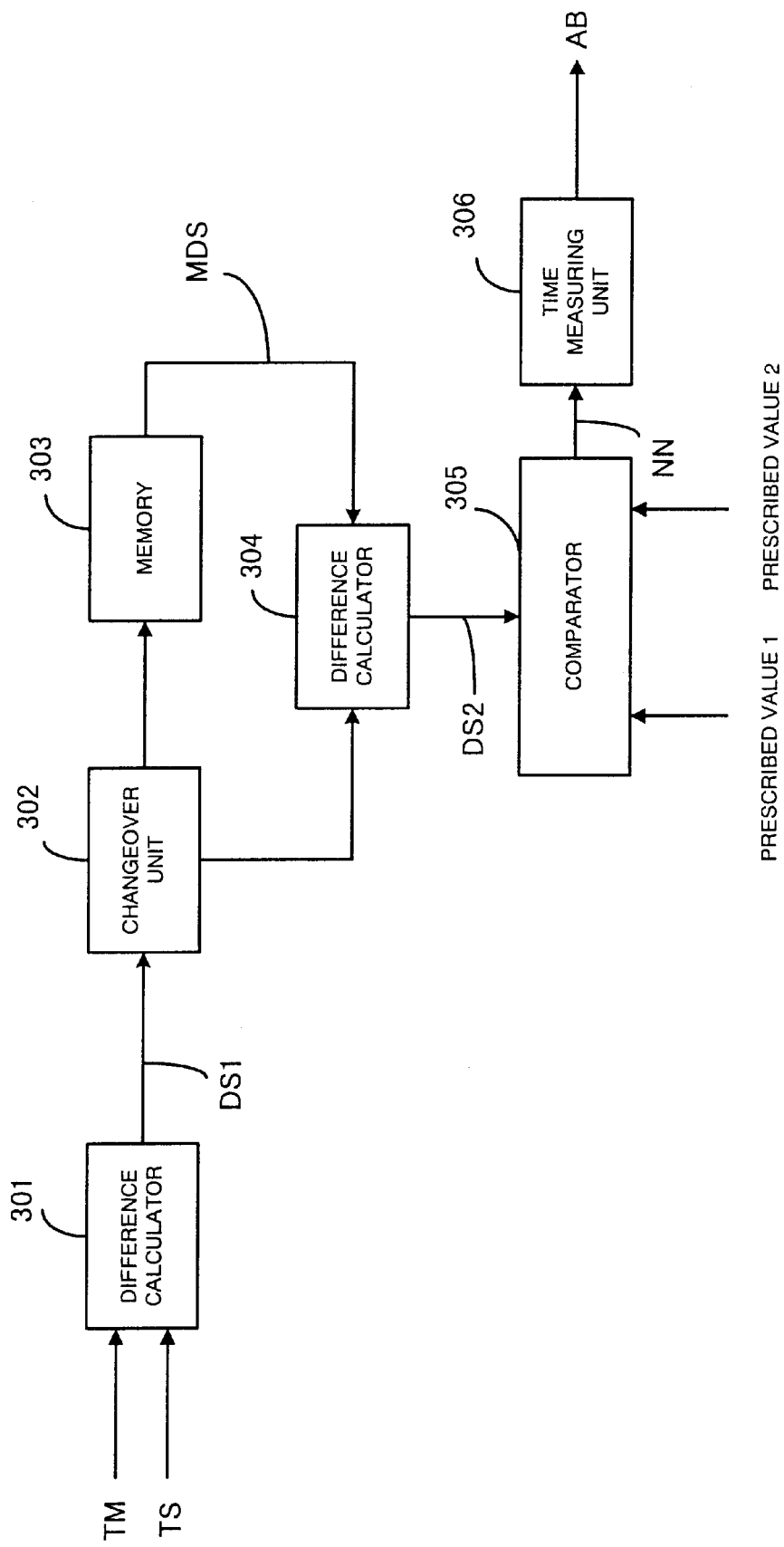
FIG. 7 is a block diagram showing an example of configuration of the torque offset abnormality detecting means.

FIG. 7 is a block diagram showing an example of internal structure of the torque sensor offset abnormality detecting means 300, which comprises a difference calculator 301 for calculating the difference of the main torque signal TM and the sub torque signal TS, a changeover unit 302 for feeding the difference DS1 output from the difference calculator 301 into a memory (nonvolatile memory) 303 or a difference calculator 304, a comparator 305 for comparing the difference DS2 outputted from the difference calculator 304 for comparing the stored value and present value and calculating the difference, with the prescribed value 1 and the prescribed value 2 (>prescribed value 1) as thresholds, and a time measuring unit 306 for measuring the time of state signal NN outputted from the comparator 305 and issuing a specified operation signal AB before or after lapse of prescribed time 1 and prescribed time 2 (>prescribed time 1).

Figure 8:
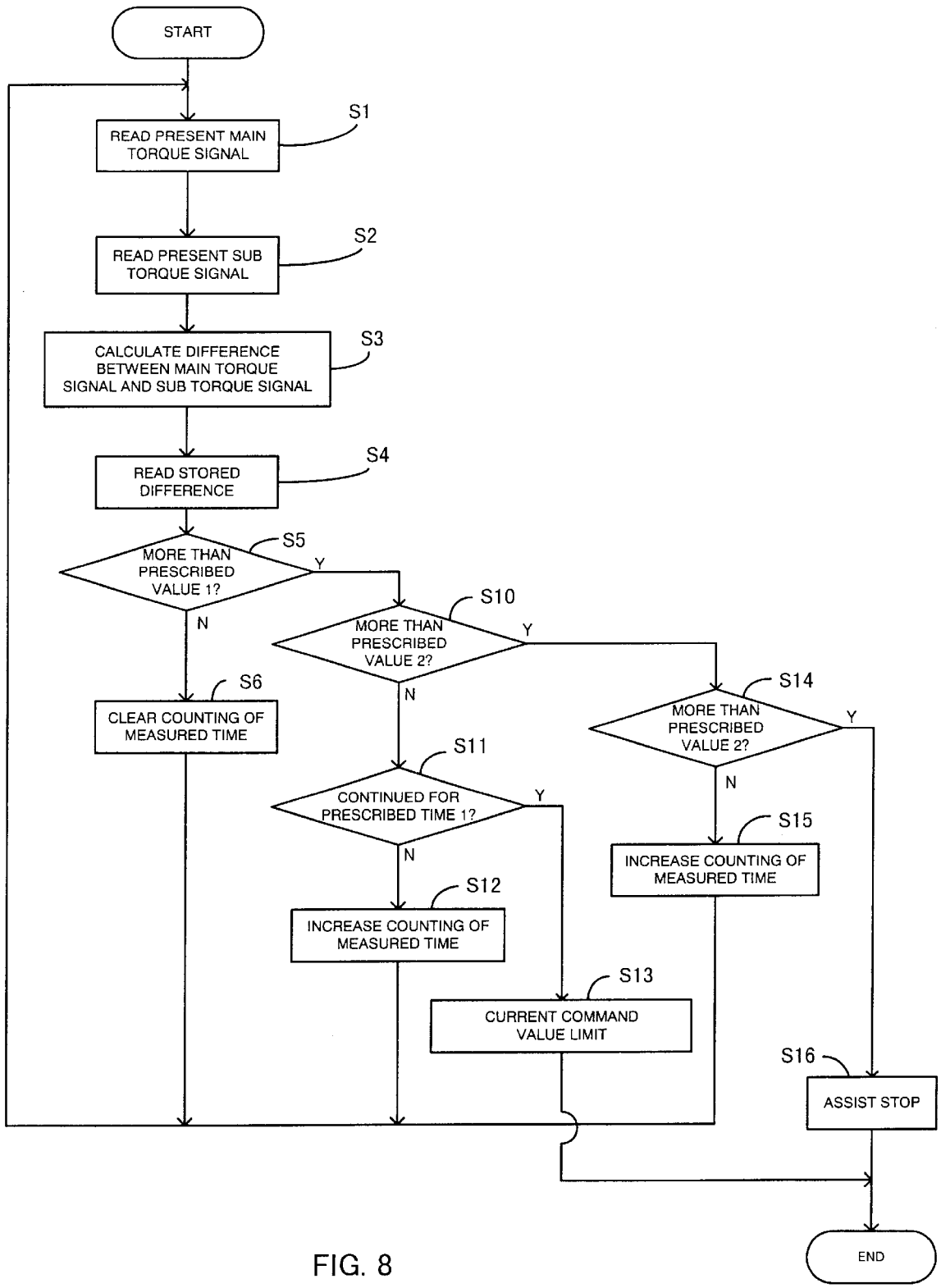
FIG. 8 is a flowchart showing an example of operation of the first embodiment of the present invention.

In this configuration, the operation is explained by referring to the flowchart in FIG. 8.

First, before shipping the products, that is, in the initial state, the difference between the main torque signal TM and the sub torque signal TS of the torque sensor 10 is calculated in the difference calculator 301, and is stored in the non-volatile memory 303 as offset data. That is, the changeover unit 302 is changed over to the memory 303 side, and the difference DS1 between the main torque signal TM and the sub torque signal TS is calculated in the difference calculator 301, and the difference DS1 is stored in the memory 303 by way of the changeover unit 302 (stored value=MDS). Later, the changeover unit 302 is changed over to the difference calculator 304 side.

During the steering operation, the difference calculator 301 reads the present main torque signal TM (Step S1), and the present sub torque signal TS is read in successively (Step S2), and the difference DS1 between the main torque signal TM and the sub torque signal TS is calculated (Step S3). The difference calculator 304 receives the difference DS1 through the changeover unit 302, and reads out the stored value MDS from the memory 303 (Step S4), and calculates the difference DS2 between the difference DS1 and the stored value MDS. Consequently, the comparator 305 judges if the difference DS2 from the difference calculator 304 is more than the prescribed value 1 (threshold) or not (Step S5). That is, the stored value MDS is the offset component, and it is judged if abnormality has occurred or not due to increase of the difference DS1 becoming larger than the prescribed value 1. It is normal when the difference DS2 is smaller than the prescribed value 1, and counting of measuring time is cleared (Step S6), and the process returns to the Step S1.

When the difference DS2 is more than the prescribed value 1, it is further judged if more than the prescribed value 2 or not (Step S10), and when the difference DS2 is smaller than the prescribed value 2, it is judged if it continues for a prescribed time 1 or not (Step S11). If the difference does not continue for the prescribed time 1, counting of measured time is increased, and the process returns to the Step S1 (Step S12), and when continued for the prescribed time 1, an operation signal AB is outputted, and a limit current LT is outputted from the current command limit value generating means 310, and the assist is limited and the operation is terminated (Step S13).

Further, at the Step S10, when the difference DS2 is more than the prescribed value 2, it is judged if the difference DS2 continues for a prescribed time 2 or not (Step S14), if not continuing for the prescribed time 2, counting of measured time is increased, and the process returns to the Step S1 (Step S15), and when continued for the prescribed time 2, an operation signal AB is outputted, and a limit current LT is outputted from the current command limit value generating means 310, and the assist is stopped and the operation is terminated (Step S16).

Figure 9:
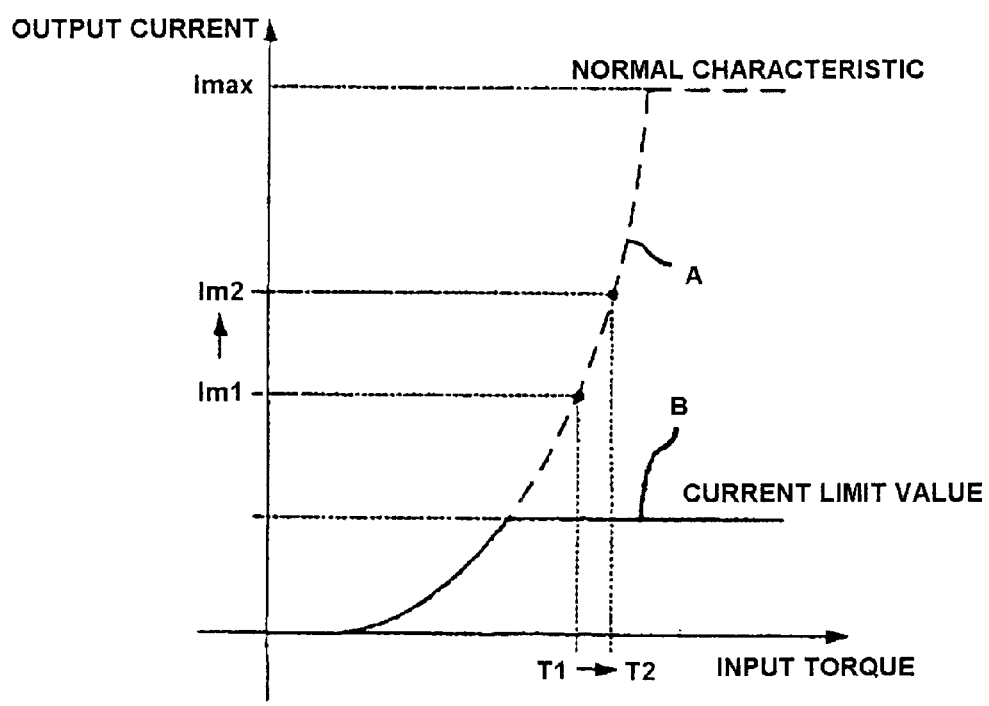
FIG. 9 is a diagram for explaining the operation of the present invention.
Figure 10:
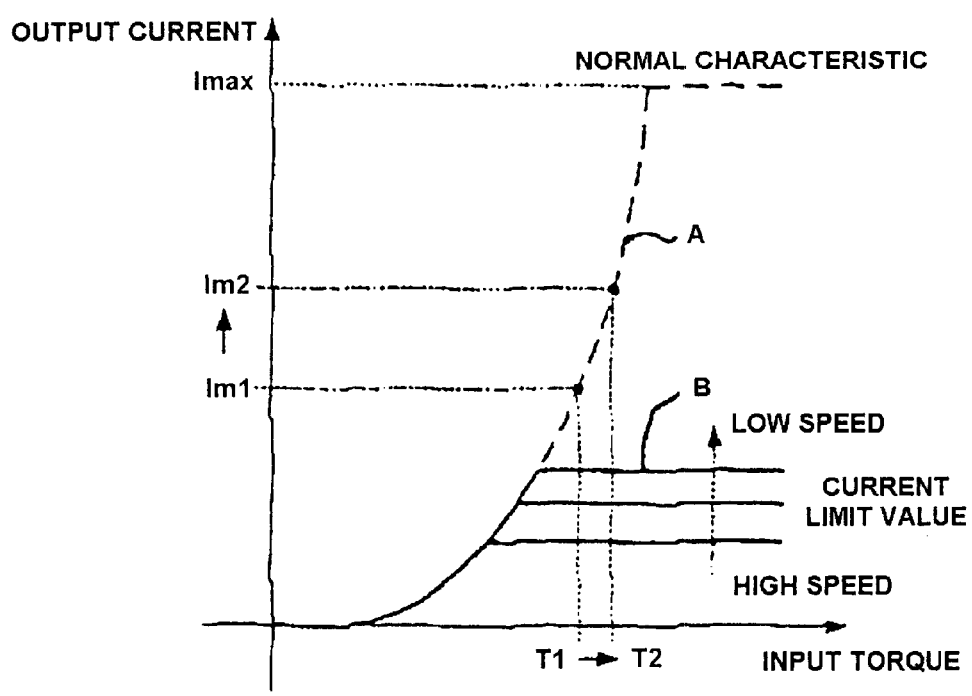
FIG. 10 is a diagram for explaining the operation of the present invention.

FIG. 9 shows a mode of assist limiting, in which a characteristic A is a normal mode torque-current characteristic, and when an operation signal AB is outputted from the torque sensor offset abnormality detecting means 300, the current command limit value generating means 310 outputs a limit current LT for limiting the motor current so that the steering assist command value I of the output of the subtractor 320 may be a characteristic B in FIG. 9. Meanwhile, a vehicle speed signal V from the vehicle speed sensor 12 is inputted to the steering assist command value calculator 32, and the current limit value may be increased as the vehicle speed V becomes lower as shown in FIG. 10.

Figure 11:
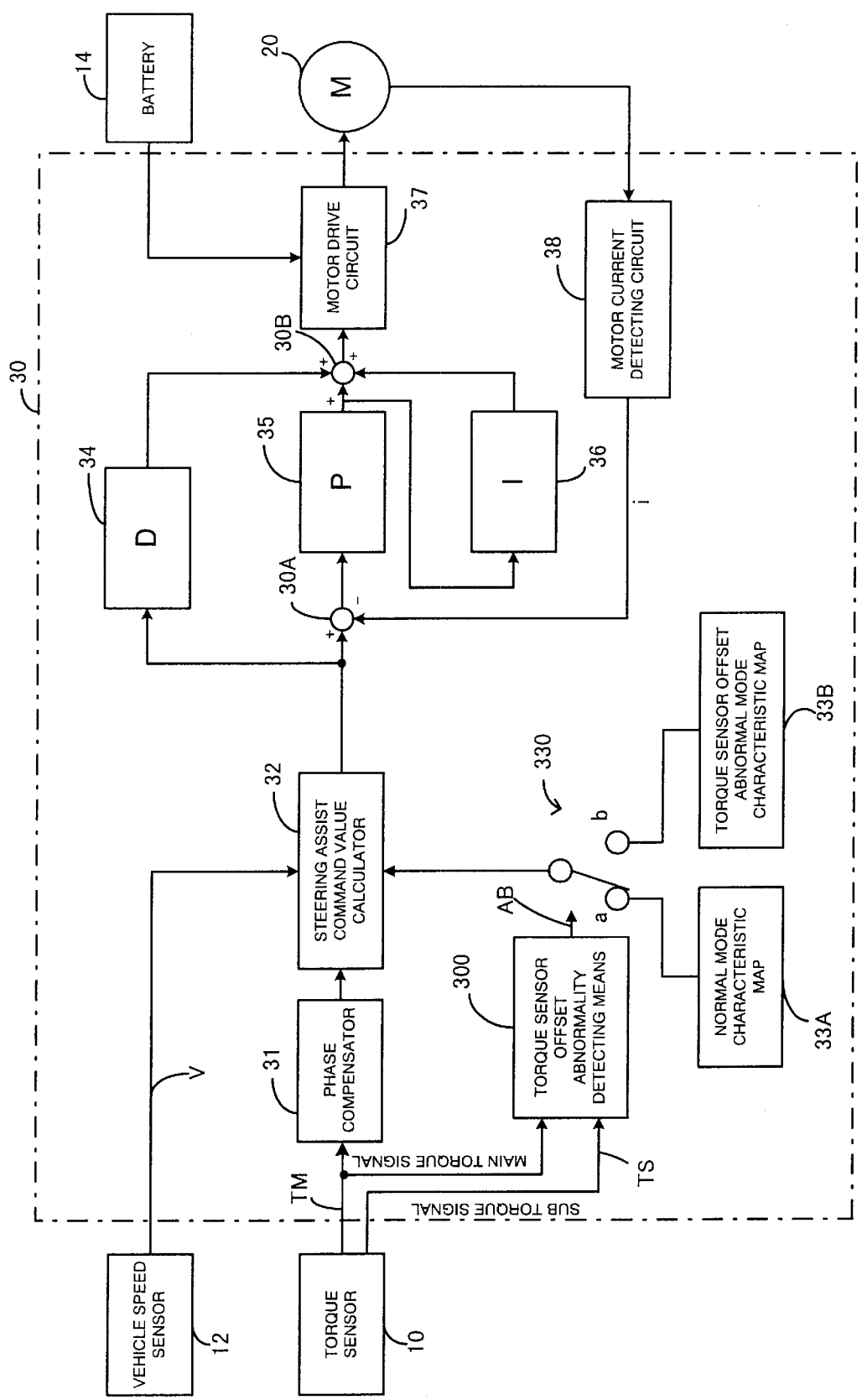
FIG. 11 is a block diagram showing a configuration of a second embodiment of the present invention.
Figure 12:
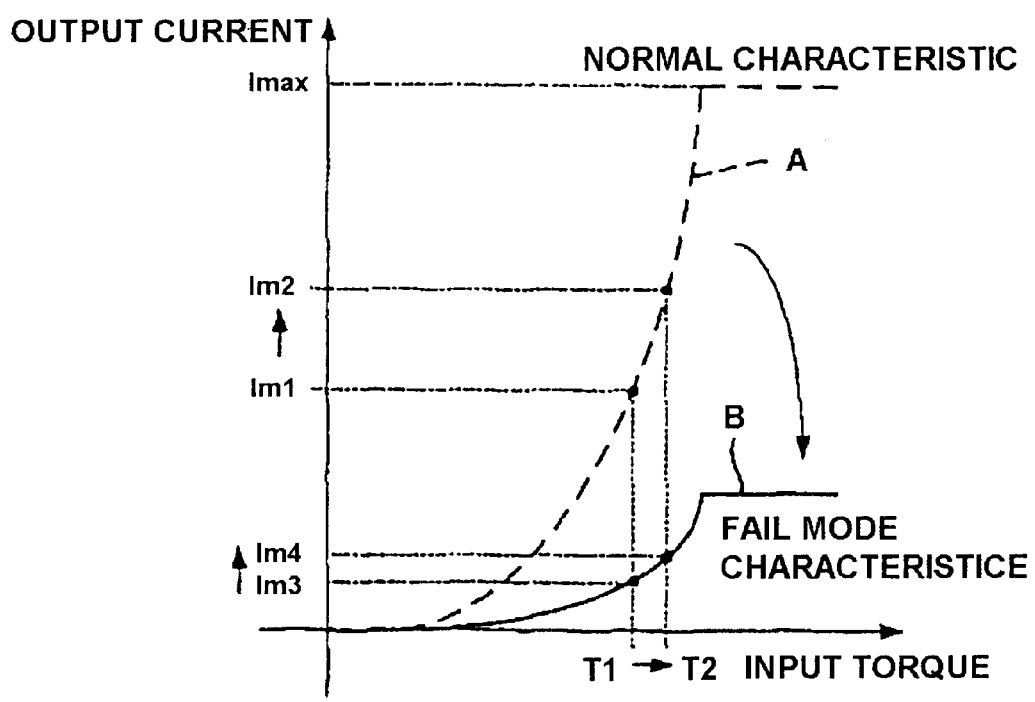
FIG. 12 is a diagram for explaining the operation of the present invention.

FIG. 11 shows a second embodiment of the present invention corresponding to FIG. 6, and in this embodiment, a normal mode characteristic map 33A and a torque sensor offset abnormal mode characteristic map 33B are provided as characteristic map, and a switch 330 is provided for changing over by an operation signal AB from the torque sensor offset abnormality detecting means 300. The outputs of the normal mode characteristic map 33A and torque sensor offset abnormal mode characteristic map 33B are inputted to the steering assist command value calculator 32 by way of contacts "a" and "b" of the switch 330. The characteristic of the normal mode characteristic map 33A is a characteristic A indicated by broken line in FIG. 12, and the characteristic of the torque sensor offset abnormal mode characteristic map 33B is a characteristic B indicated by solid line in FIG. 12, and when normal, the switch 330 is connected to the contact "a", and the assist operation according to the characteristic A of the normal mode characteristic map 33A is carried out. When an operation signal AB is outputted from the torque sensor offset abnormality detecting means 300, the contact of the switch 330 is changed over from the contact "a" to "b", and the assist operation according to the characteristic B of the torque sensor offset abnormal mode characteristic map 33B is carried out, and the motor current is limited.

Figure 13:
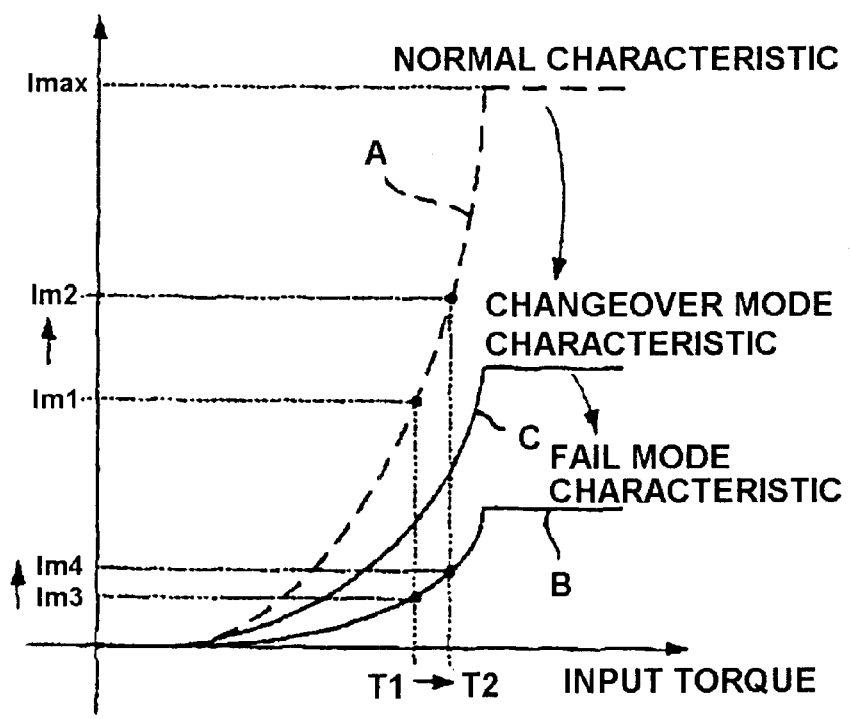
FIG. 13 is a diagram for explaining the operation of the present invention.

In the second embodiment, by changing over the normal mode characteristic map 33A and the torque sensor offset abnormal mode characteristic map 33B, the steering assist command value I is calculated, and since the difference is significant when changed over from the characteristic A to the characteristic B, the driver may feel a sense of strangeness in the steering operation. To avoid such problem, an intermediate characteristic map having an intermediate characteristic C as shown in FIG. 13 may be provided. That is, by changing over in gradual steps from a normal mode characteristic A to an intermediate characteristic C and a torque sensor offset abnormal mode characteristic B, sense of strangeness in operation due to change of characteristics may be prevented.

Figure 14:
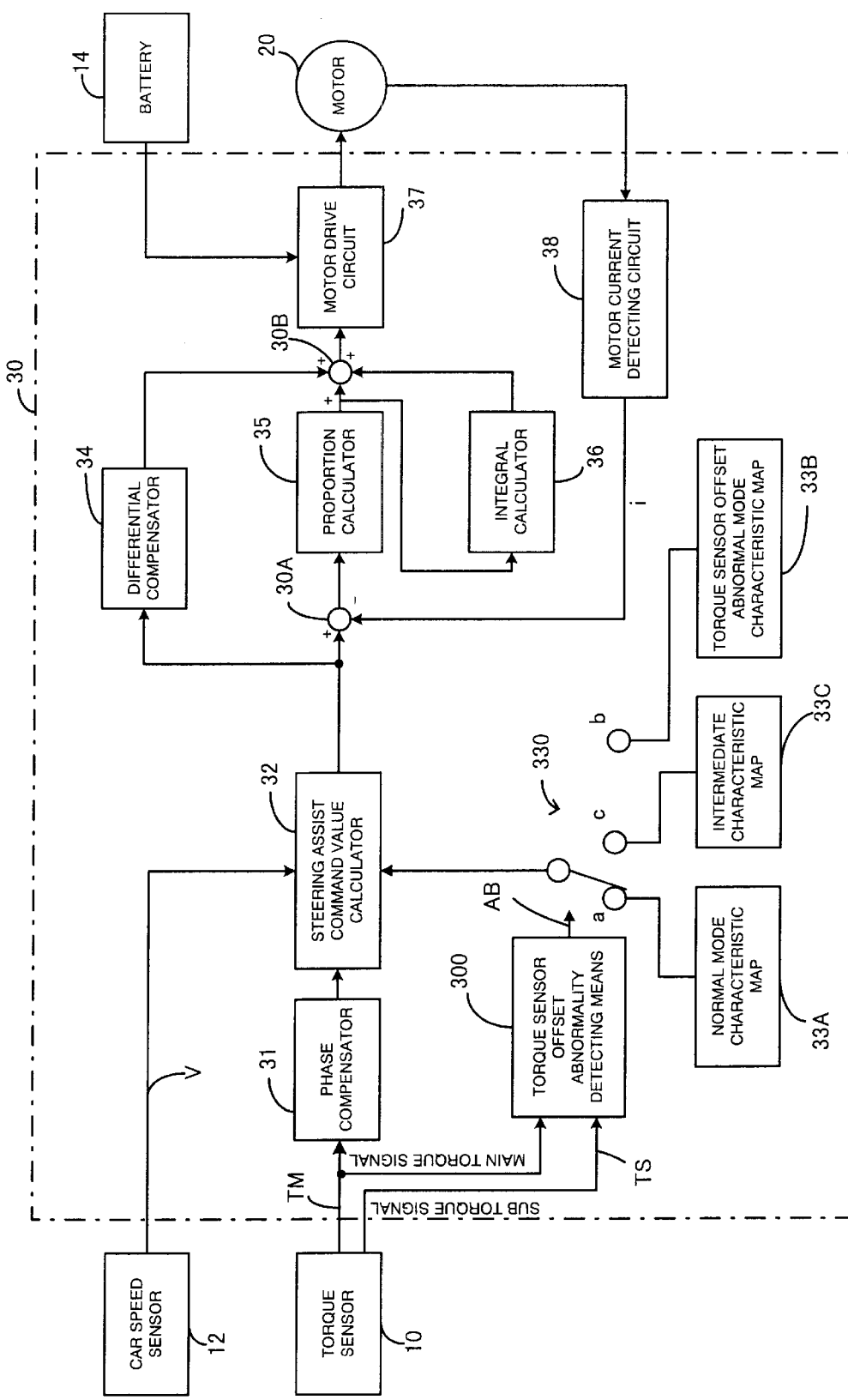
FIG. 14 is a block diagram showing a configuration of a third embodiment of the present invention.
Figure 15:
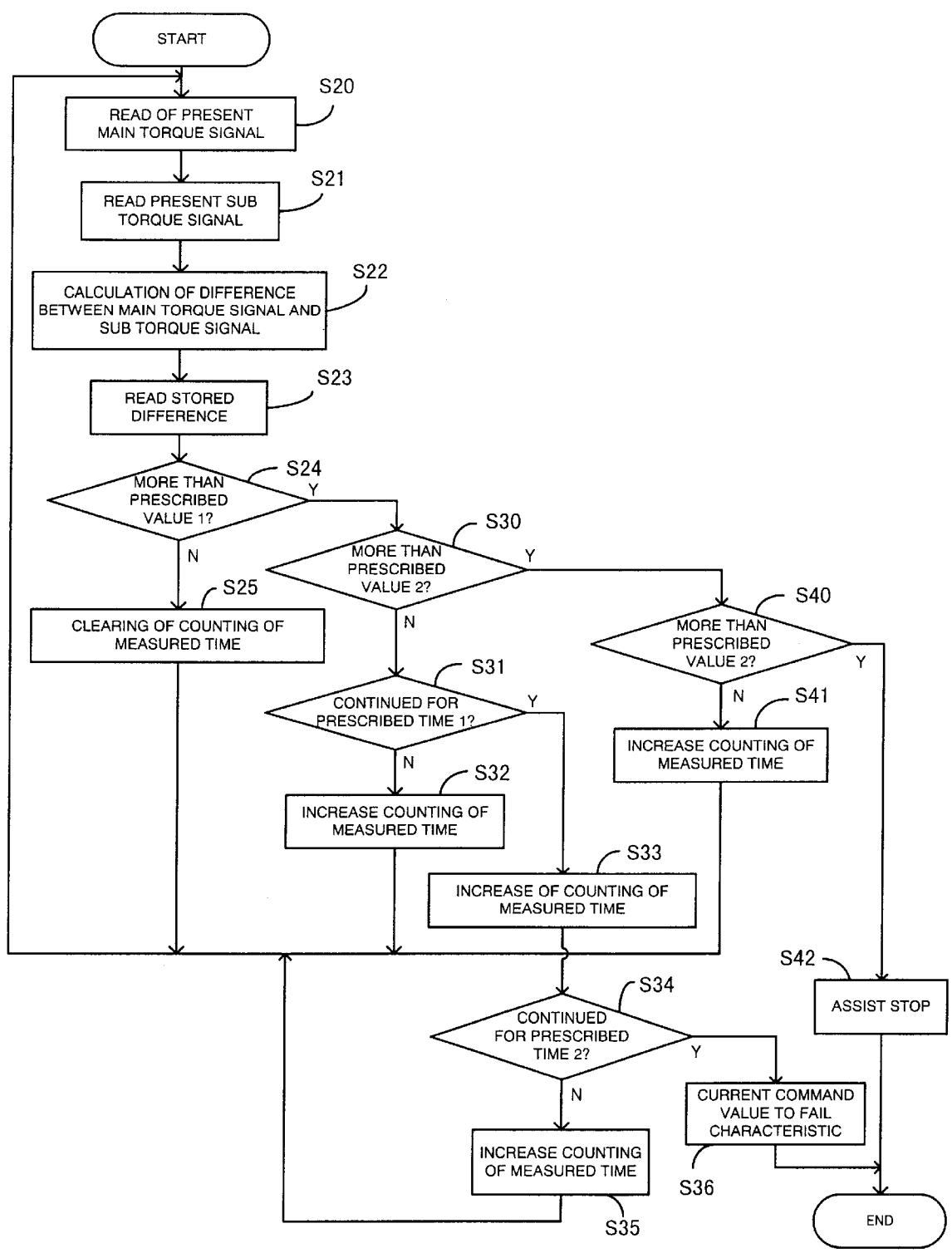
FIG. 15 is a flowchart showing an example of operation of the third embodiment of the present invention.

When an intermediate characteristic map 33C (contact "c" of the switch 33) is provided, a configuration of a third embodiment is as shown in FIG. 14, and its operation is explained by referring to a flowchart in FIG. 15. The operation is same as in the second embodiment shown in FIG. 11 except that the torque sensor offset abnormality detecting means 300 outputs the operation signal AB in three stages.

First, before shipping products, the difference between the main torque signal TM and the sub torque signal TS of the torque sensor 10 is calculated and stored in the memory 303, same as in the first and second embodiments. The contact of the switch 330 is connected to "a", and the data of the normal mode characteristic map 33A is put in the steering assist command value calculator 32. During the steering operation, the difference calculator 301 reads the present main torque signal TM (Step S20), and the present sub torque signal TS is read in successively (Step S21), and the difference DS1 between the main torque signal TM and the sub torque signal TS is calculated (Step S22). The difference calculator 304 receives the difference DS1 through the changeover unit 302, and reads out the stored value MDS from the memory 303 (Step S23), and calculates the difference DS2 between the difference DS1 and stored value MDS. Consequently, the comparator 305 judges if the difference DS2 from the difference calculator 304 is more than the prescribed value 1 (threshold) or not (Step S24), and it is normal when the difference DS2 is smaller than the prescribed value 1, and counting of measuring time is cleared (Step S25), and the process returns to the Step S20.

When the difference DS2 is more than the prescribed value 1, it is further judged if more than the prescribed value 2 or not (Step S30), and when the difference DS2 is smaller than the prescribed value 2, it is judged if it continues for a prescribed time 1 or not (Step S31). If the difference does not continue for the prescribed time 1, it is judged normal, and counting of measured time is increased, and the process returns to the Step S20 (Step S32), and when continued for the prescribed time 1, an operation signal AB is outputted from the time measuring unit 3067, and the contact of the switch 330 is changed over from the contact "a" to "c", and the data of the intermediate characteristic map 33C is inputted to the steering assist command value calculator 32, and the current command value is limited (Step S33).

Further, judging if the current limiting continues for more than the prescribed value 2 or not (Step S34), if not continued for a prescribed time 2, counting of measured time is increased, and the process returns to the Step S20 (Step S35), and when continued for the prescribed time 2, the contact of the switch 330 is changed from "c" to "b" by an operation signal AB, and the current command value is changed over to fail characteristic, and the operation is terminated (Step S36). That is, the data of the torque sensor offset abnormal mode characteristic map 33B is inputted to the steering assist command value calculator 32.

On the other hand, when the difference DS2 is more than the prescribed value 2 at the Step S30, judging if continuing for the prescribed time 2 or not (Step S40), and when not continuing for the prescribed time 2, counting of measured time is increased, and the process returns to the Step S20 (Step S41), and when continued for the prescribed time 2, an operation signal AB is outputted, and the assist is inhibited and the operation is terminated (Step S42).

In the embodiment in FIG. 14, the normal mode characteristic map 33A, the intermediate characteristic map 33C and the torque sensor offset characteristic map 33B individually have the assist inhibit region and the assist limit region.

In the embodiment, one intermediate characteristic map is used, but more intermediate characteristic maps may be used and changed over in multiple stages. The present invention can be applied not only in the column type and pinion type power steering device, but also in the rack assist type power steering device.

According to the present invention, intermediate troubles such as offset or drift are monitored out of signal troubles of torque sensor, and a trouble of torque sensor can be detected correctly, and if a trouble is detected, the current is limited, and the assist function is limited, so that a safe operation is realized. Moreover, the steering operation is free from any feel of strange sense because the current limiting is changed over depending on the vehicle speed or changed over in gradual steps.

What is claimed is:

1. A control apparatus of a power steering device for controlling a motor on the basis of a current control value calculated from a steering assist command value calculated by calculating means on the basis of a steering torque generated on a steering shaft, and a current value of a motor for applying a steering assist force to a steering mechanism, wherein a difference of a main torque signal and a sub torque signal of a torque sensor for detecting the steering torque is stored preliminarily, and the difference of the main torque signal and the sub torque signal during an operation is compared with the stored value, and at least the current control value is limited when the difference based on the comparison is a state larger than a first prescribed value and continues for a time longer than a first prescribed time, wherein an output of the current control value is stopped when the difference based on the comparison is larger than a second prescribed value which is larger than the first prescribed value and further the state continues for a time longer than a second prescribed time which is shorter than the first prescribed time.

2. A control apparatus of a power steering device according to claim 1, wherein the limitation of the current control value is carried out according to a vehicle speed.

3. A control apparatus of a power steering device according to claim 2, wherein the limitation of the current control value is carried out by limiting a maximum current of the steering assist command value.

4. A control apparatus of a power steering device according to claim 2, wherein the limitation of the current control value is carried out by limiting a maximum current obtained by multiplying a prescribed gain with the steering assist command value.

5. A control apparatus of a power steering device according to claim 1, wherein the steering assist command value is calculated on the basis of an output of a normal mode characteristic map, and when the state of the difference based on the comparison being different from the first prescribed value continues for a time longer than the first prescribed time or the second prescribed time, the normal mode characteristic map is changed over to a torque sensor offset abnormal mode characteristic map.

6. A control apparatus of a power steering device according to claim 5, wherein an intermediate characteristic map is used so as to change without any sense of strangeness when changing over from the normal mode characteristic map to the torque sensor offset abnormal mode characteristic map.

7. A control apparatus of a power steering device according to claim 5, wherein the change over from the normal mode characteristic map to the torque sensor offset abnormal mode characteristic map is carried out by using a torque sensor offset abnormality detecting means.

8. A control apparatus of a power steering device according to claim 6, wherein the change over from the normal mode characteristic map to the intermediate characteristic map and the torque sensor offset abnormal mode characteristic map is carried out by using a torque sensor offset abnormality detecting means.

9. A control apparatus of a power steering device according to claim 7, wherein the torque sensor offset abnormality detecting means a first difference calculator for calculating the difference between the main torque signal and the sub torque signal, a memory for storing the difference from the first difference calculator through a changeover means, a second difference calculator for calculating a difference between a difference from the first difference calculator through the changeover means and the stored value from the memory, a comparator for comparing the difference from the second difference calculator with the first prescribed value and the second prescribed value and a time measuring means for measuring a lapse time of an output of the comparator.

10. A control apparatus of a power steering device according to claim 8, wherein the torque sensor offset abnormality detecting means a first difference calculator for calculating the difference between the main torque signal and the sub torque signal, a memory for storing the difference from the first difference calculator through a changeover means, a second difference calculator for calculating a difference between a difference from the first difference calculator through the changeover means and the stored value from the memory, a comparator for comparing the difference from the second difference calculator with the first prescribed value and the second prescribed value and a time measuring means for measuring a lapse time of an output of the comparator.

* * * * *